United States Patent
Barowski et al.

(10) Patent No.: US 7,509,511 B1
(45) Date of Patent: Mar. 24, 2009

(54) REDUCING REGISTER FILE LEAKAGE CURRENT WITHIN A PROCESSOR

(75) Inventors: Harry S. Barowski, Boeblingen (DE); Tobias Gemmeke, Santa Clara, CA (US); Jens Leenstra, Bondorf (DE); Tim Niggemeier, Laatzen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/116,085

(22) Filed: May 6, 2008

(51) Int. Cl.
*G06F 1/32* (2006.01)

(52) U.S. Cl. .................. 713/320; 713/300; 711/106

(58) Field of Classification Search .............. 713/300, 713/320; 711/106
See application file for complete search history.

(56) References Cited

U.S. PATENT DOCUMENTS

| | | | |
|---|---|---|---|
| 7,010,656 B2 * | 3/2006 | Gupta | 711/165 |
| 2006/0047493 A1 * | 3/2006 | Gooding | 703/18 |
| 2006/0168463 A1 | 7/2006 | Terechko et al. | |
| 2006/0195707 A1 | 8/2006 | Rychlik | |
| 2007/0162775 A1 | 7/2007 | Raghuvanshi | |
| 2007/0180187 A1 * | 8/2007 | Olson et al. | 711/106 |
| 2008/0133876 A1 * | 6/2008 | Kwon et al. | 711/209 |

* cited by examiner

*Primary Examiner*—Thomas Lee
*Assistant Examiner*—Vincent T Tran
(74) *Attorney, Agent, or Firm*—Dillon & Yudell LLP

(57) ABSTRACT

A method for reducing leakage current within a register file of a processor is disclosed. The register file within the processor is partitioned into at least two power domains, and each of the two power domains can be powered independently. At least one of the two power domains includes at least as many physical registers as there are architected registers defined in an instruction set architecture of the processor. In response to an occurrence of an idle condition within the processor, all architected register file entries are consolidated into one of power domains that will not be powered off, and the power domains that does not contain any architected register file entries after consolidating are powered off. Afterwards, in response to a detection of an end of the idle condition, all of the power domains are powered back on.

1 Claim, 5 Drawing Sheets

REDUCING REGISTER FILE LEAKAGE CURRENT WITHIN A PROCESSOR

BACKGROUND OF THE INVENTION

1. Technical Field

The present invention relates to processors in general, and in particular to register files within processors. Still more particularly, the present invention relates to a method for reducing leakage current within a register file of a processor.

2. Description of Related Art

In modern out-of-order processors, register renaming is fundamental requirement for eliminating data dependencies, such as write-after-write (WAW), write-after-read (WAR) and read-after-read (RAR) conflicts. Register renaming is achieved by introducing a set of additional auxiliary physical registers to increase the number of registers beyond the number of registers defined in the instruction set architecture of a processor. The architected state of the processor is guaranteed by means of an alias table. Efficient out-of-order implementations utilize a multiple rename register space to keep track of all data needed by instructions in flight. Since the register file contains instruction operands and result data, the register file must not be powered off, even during periods when the functional units of the processor are idle. State retention is needed until the data in the rename registers can be stored in a memory subsystem.

The register file, which typically covers a large area of a processor chip, is a critical source of leakage currents. The amount of passive leakage power can be reduced by powering off the entire register file or certain unused portions of the register file. The register file can be powered off during idle periods by, for example, storing all register contents to a memory subsystem. However, once the functional units are again active, all register data must be reloaded back from the memory subsystem to the register file by a series of load instructions. The series of load instructions required to reload all the stored register data from the subsystem introduce latency and active power issues that typically associated with load/store operations, which offsets the benefit from powering off the register file.

Consequently, it would be desirable to provide an improved method for reducing leakage current within a register file of a processor such that the power consumption of the processor can be reduced.

SUMMARY OF THE INVENTION

In accordance with a preferred embodiment of the present invention, a register file within a processor is partitioned into at least two power domains, and each of the power domains can be powered independently. At least one of the power domains includes at least as many physical registers as there are architected registers defined in an instruction set architecture of the processor. The register file includes rename register file entries and architected register file entries. In response to an occurrence of an idle condition within the processor, all architected register file entries are consolidated into one of the power domains that will not be powered off, and the power domains that do not contain any register file entries after consolidating are powered off. Afterwards, in response to a detection of an end of the idle condition, all the power domains are powered back on.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
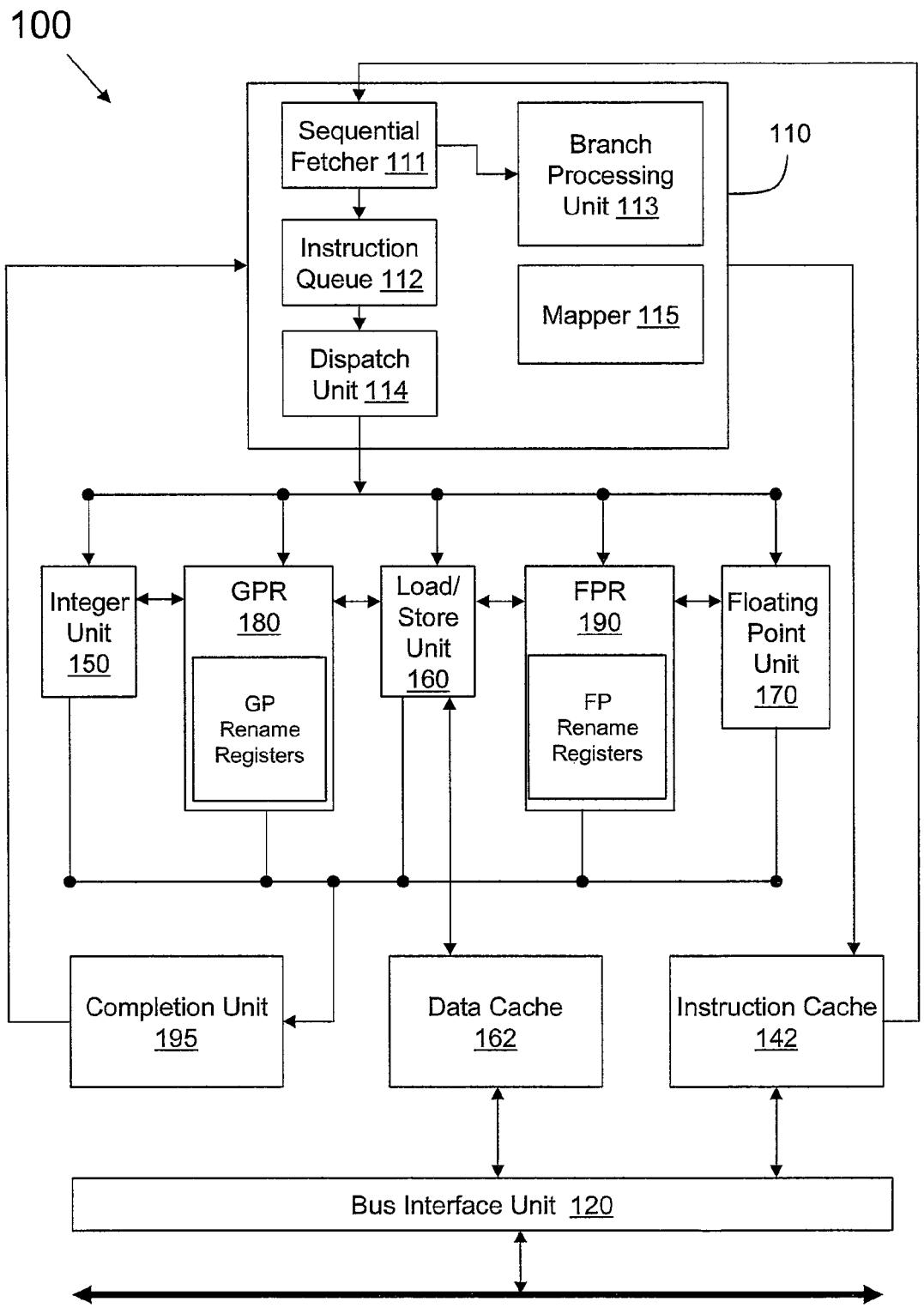
FIG. 1 is a block diagram of a processor in which a preferred embodiment of the present invention may be incorporated.

With reference now to the drawings, and in particular to FIG. 1, there is illustrated a block diagram of a processor in which a preferred embodiment of the present invention may be incorporated. As shown, within a processor 100, a bus interface unit 120 is coupled to a data cache 162 and an instruction cache 140. Both data cache 162 and instruction cache 142 are high speed set-associative caches which enable processor 100 to achieve a relatively fast access time to a subset of data or instructions previously transferred from a main memory (not shown). Instruction cache 142 is further coupled to an instruction unit 110 which fetches instructions from instruction cache 142 during each execution cycle. Instruction unit 110 may include a sequential fetcher 111 coupled to a branch processing unit 113, an instruction queue 112, a dispatch unit 114, and a mapper 115.

Processor 100 also includes three execution units, namely, an integer unit 150, a load/store unit 160, and a floating-point unit 170. Each of execution units 150, 160, 170 can execute one or more classes of instructions, and all execution units 150, 160, 170 can operate concurrently during each processor cycle. After execution of an instruction has terminated, any of execution units 150, 160, 170 stores data results to a respective rename buffer, depending upon the instruction type. Then, any one of execution units 150, 160, 170 may signal a completion unit 195 that the execution of an instruction has been completed. Each instruction is completed in program order, and the result data are transferred from a respective rename buffer to a general purpose register 180 or a floating-point register 190, accordingly.

Figure 2:
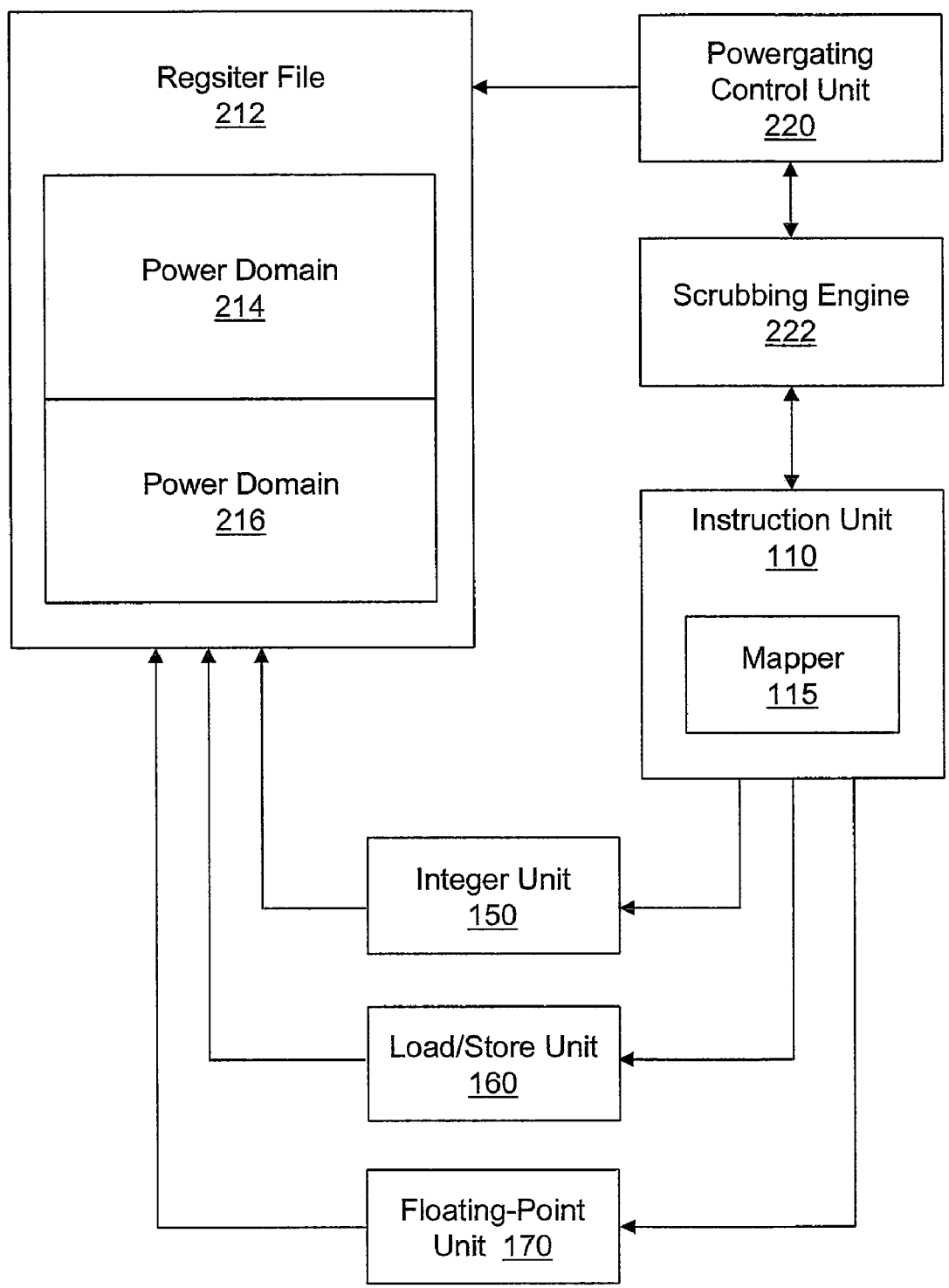
FIG. 2 is a block diagram of a register file within the processor from FIG. 1, in accordance with a preferred embodiment of the present invention.

With reference now to FIG. 2, there is depicted a block diagram of a register file within processor 100 from FIG. 1, in accordance with a preferred embodiment of the present invention. As shown, a register file 212 is partitioned into two power domains 214 and 216. Each one of power domains 214, 216 is powergated so that each power domain can be independently powered off via a powergating control 220 to reduce transistor gate leakage current. Register file 212 contains the physical registers of processor 100. The physical registers of register file 212 store architected register file entries and rename register file entries. Architected register file entries correspond to the logical registers defined by the instruction set architecture of the processor (architected registers). Rename register file entries are stored in register file 212 for register renaming. The total number of registers in at least one of power domains 214, 216 is equal to or greater than the number of architected registers.

Mapper 115 within instruction unit 110 includes logic for mapping architected registers defined by the instruction set architecture (ISA) of processor 100 to corresponding physical registers in register file 212, which exceeds the number of architectural registers specified by the ISA. Mapper 115 maps the architectural registers encoded in the program instructions to corresponding physical registers in register file 212 prior to the execution of the instructions by execution units 150, 160, 170.

An instruction may be held in instruction queue 112 (from FIG. 1) until the instruction is ready to be dispatched to an appropriate one of execution units 150, 160, 170. Operands for issued instructions are loaded by execution units 150, 160, 170 from register file 212. Reservation stations (not shown) may hold the operands retrieved from register file 212 prior to execution of the instructions in execution units 150, 160, 170. Results from instructions executed by execution units 150, 160, 170 are stored to register file 212. The results may be temporarily stored in a reorder buffer (not shown) before the results are stored to register file 212 and/or committed to the system memory.

Upon detection of an idle condition of processor 100, powergating control unit 220 sends a request to a scrubbing engine 222, and scrubbing engine 222 then consolidates all the register file entries corresponding to an architected register (an architected register file entry) in register file 212 into one of power domains 214, 216 by moving register entries from power domain 214 to power domain 216 or vice versa. In one embodiment of the present invention, scrubbing engine 222 determines which power domain has the most architected register file entries before consolidating. Scrubbing engine 222 then consolidates the architected register file entries into the power domain having the most architected register file entries, thereby reducing the number of data move operations needed to consolidate the architected register file entries. Scrubbing engine 222 can be a state machine or microcode containing instructions initiated by instruction unit 110.

At least one of power domains 214, 216 includes a number of registers that is equal to or greater than the number of architected registers defined in the ISA. Therefore, at least one of power domains 214, 216 is able to store all architected register file entries upon detection of an idle condition. However, for a processor unit that permits multiple independent threads of execution, known as simultaneous multi-threading (SMT), each thread needs to preserve a copy of the architected register file entries for that thread during idle periods. Thus, in an SMT processor unit, register file 212 may be divided into more than one power domain and more than one power domain may remain powered on to store the architected register file entries for each thread. For example, a processor unit that supports the execution of four simultaneous threads (SMT-4) needs to have five power domains: one power domain to store the architected registers of each simultaneous thread (a total of four power domains) and one additional power domain, representing the registers of the rename space, which can be powered off during idle periods. If the same SMT-4 processor is running in restricted SMT-2 mode (i.e., the processor is capable of executing 4 simultaneous threads, but is operating a mode that only allows the execution of two simultaneous threads), then only two of the power domains need to remain powered to store the architected register file entries for the two processor threads, and the remaining three power domains can be powered off during idle periods.

After all register entries in register file 212 that represent an architected register have been moved to one of power domains 214, 216 that will not be powered off, powergating control 220 powers off the other one of power domains 214, 216 that does not have any register entries representing architected registers, thereby reducing leakage current in register file 212. When the processor idle condition has ended, powergating control unit 220 powers on the power domain that was powered off so that the registers in that power domain can again be used for register renaming.

While exemplary register file 212 is shown having eighteen physical registers for purposes of illustration, one skilled in the art will recognize that modem processor units may have much larger register files and support multiple threads. For example, a typical register file in a processor unit that can operate in SMT-4 mode may have 32 architected registers defined by the ISA and 44 rename registers. The register file will have 172 physical registers (32 architected registers×4 threads+44 rename registers). If the processor is running in SMT-4 mode, then 128 of the 172 physical registers are needed to preserve the architected state (32 architected registers×4 threads) and the 44 rename registers can be powered off. However, if the processor is running in a restricted SMT-mode that supports two-way simultaneous multi-threading (SMT-2), only 64 physical registers are needed to preserve the architected state of the two processor threads. As a result, 108 physical registers can be powered off during an idle period, further reducing leakage current when the processor is running in a restricted SMT-mode.

Figure 3:
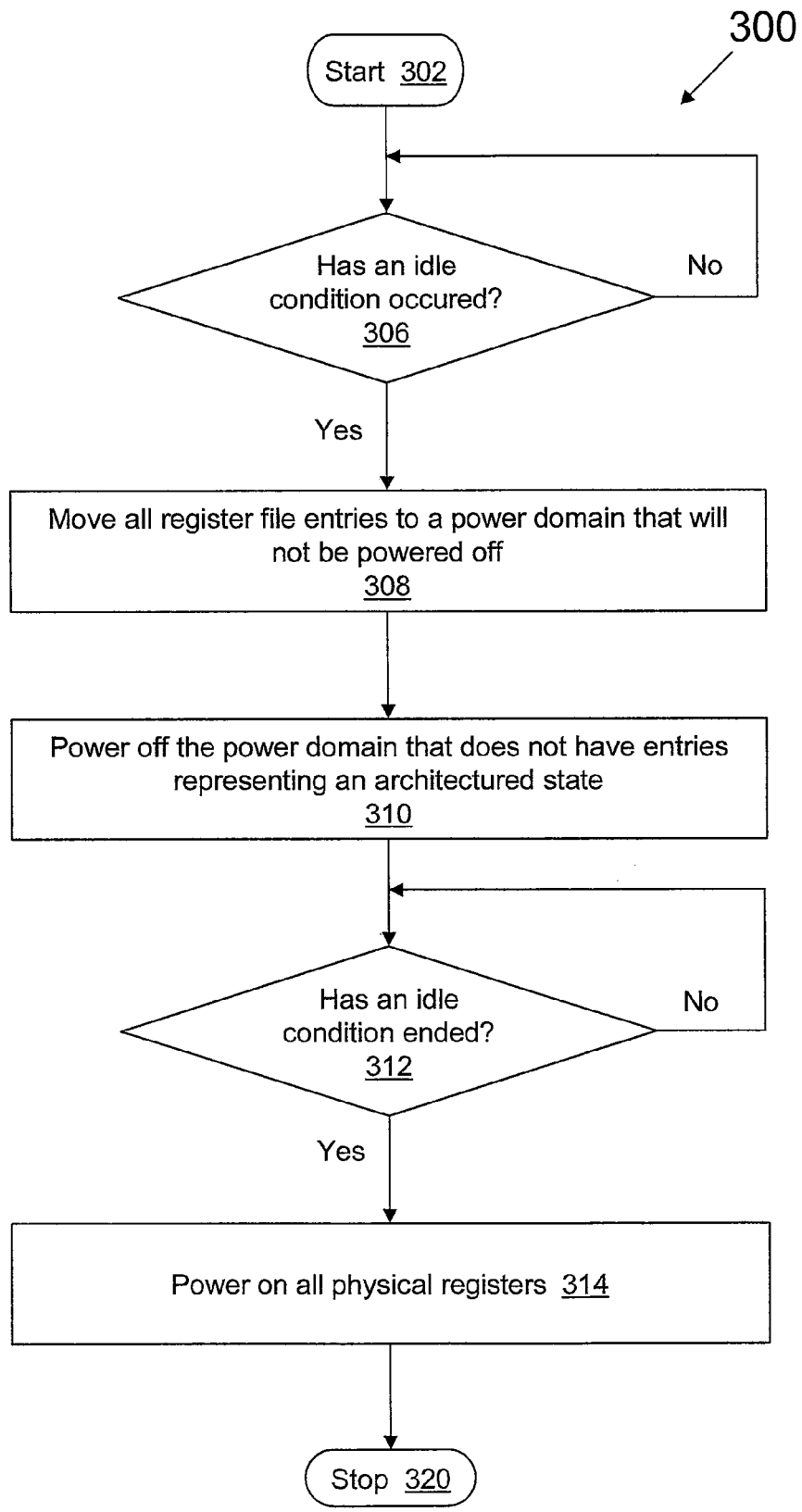
FIG. 3 is a high-level logic flow diagram of a method for reducing register file leakage current, in accordance with a preferred embodiment of the present invention.

Referring now to FIG. 3, there is depicted a high-level logic flow diagram of a method for reducing register file leakage current, in accordance with a preferred embodiment of the present invention. Starting at block 302, a determination is made whether or not an idle condition has occurred, as shown in block 306. An idle condition occurs when, for example, processor 110 is waiting for one or more resources to continue processing. If an idle condition has occurred, all register file entries representing an architected register are moved to one of the power domains that will not be powered off, as depicted in block 308.

For example, when powergating control 220 detects an idle condition has occurred, powergating control 220 sends a request to scrubbing engine 222 to begin "scrubbing" the registers of register file 212. Scrubbing engine 222 generates a series of n adjacent move instructions that copy the n architected register file entries into one of power domains 214, 216 that will remain powered on to allow state retention. The move operations can be carried out by permute type operations that will not change the data or integer type operations having a minimum latency. In one embodiment, all of the architected register file entries are consolidated in one power domain (e.g. for a processor executing one processor thread). In an alternative embodiment, all of the architected register file entries corresponding to a particular processor thread are consolidated in a power domain corresponding to that particular thread (e.g., for a processor simultaneously executing more than one processor thread).

Next, the power domain(s) that does(do) not contain any physical registers representing an architected register is(are) powered off, as shown in block 310. After all architected register file entries have been moved from power domain 216 to power domain 214, powergating control 220 can power off power domain 216 since no physical register of power domain 216 represents an architected register. By powering off the physical registers in register file 212 that are not needed to preserve the architectural state of the processor thread, a reduction in leakage current associated with those physical registers is achieved.

A determination is then made whether or not the idle condition has ended, as depicted in block 312. If the idle condition has ended, the power domain that was powered off (in block 310) are powered on again, as shown in block 314. For example, powergating control 220 can powers on power domain 216 again after the idle condition has ended. As such, the physical registers of power domain 216 are once again available for register renaming.

Figure 4:
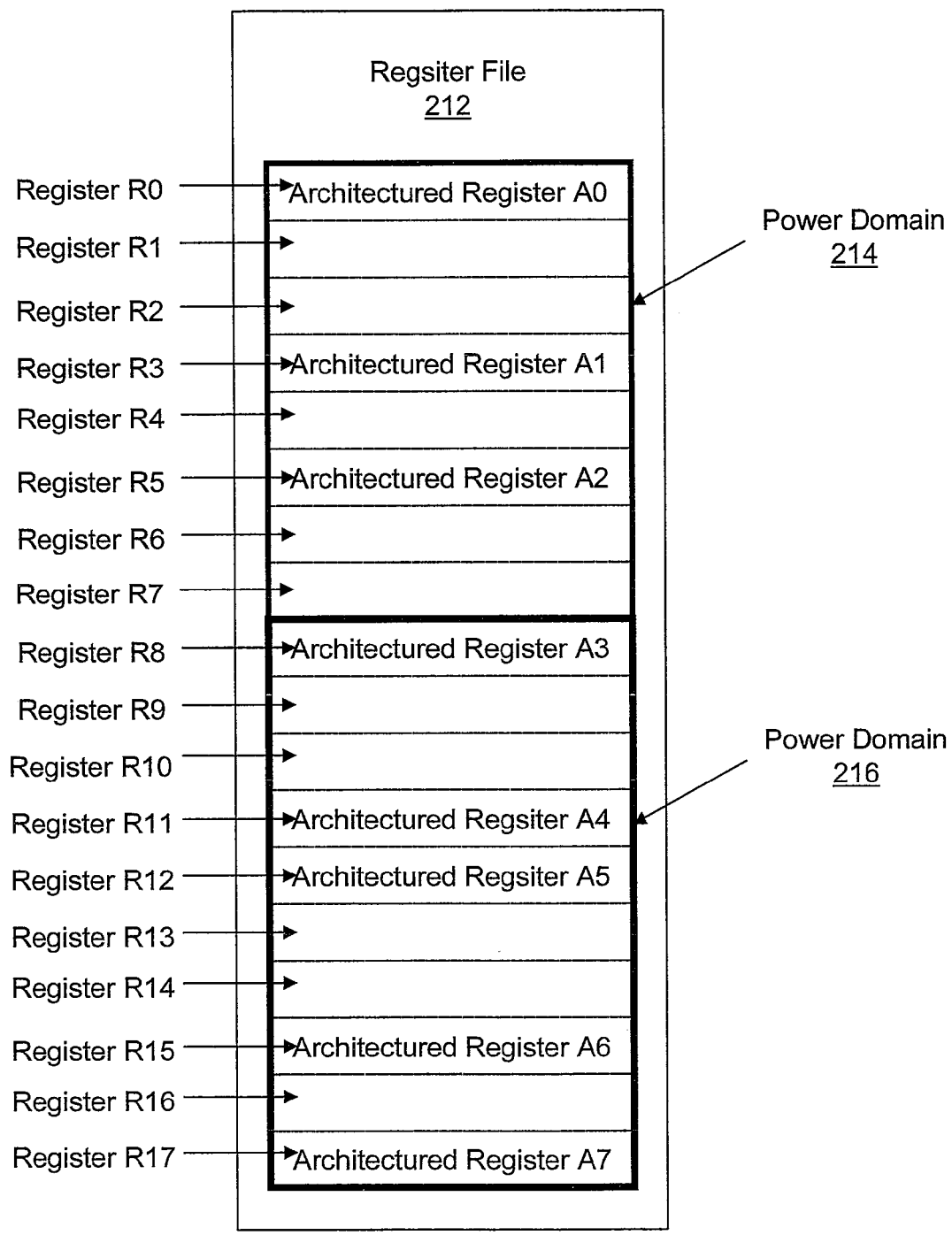
FIG. 4 depicts the state of the register file from FIG. 2 prior to "scrubbing.

With reference now to FIG. 4, there is depicted a diagram of register file 212 prior to the "scrubbing" (i.e., block 308 from FIG. 3). Register file 212 includes eighteen registers R0-R17, which are partitioned into two power domains 214-216. The ISA of processor unit 100 defines eight architected registers A0-A7. Therefore, each power domain includes at least eight physical registers. Power domain 214 includes registers R0-R7. Power domain 216 includes registers R8-R17. During execution of a thread in a processor unit that supports register renaming, physical register files are randomly assigned to architected registers. However, power domains are coarse, not based on individual physical registers. As a result, architected register file entries are spread across multiple power domains. In the example shown in FIG. 4, architected registers A0-A2 are assigned to physical registers in power domain 214 and architected registers A3-A7 are assigned to physical registers in power domain 216. Before power domain 216 can be powered off in response to detection of an idle condition, architected registers A3-A7 must be reassigned to power domain 214, which will not be powered off in response to the detection of the idle condition.

Figure 5:
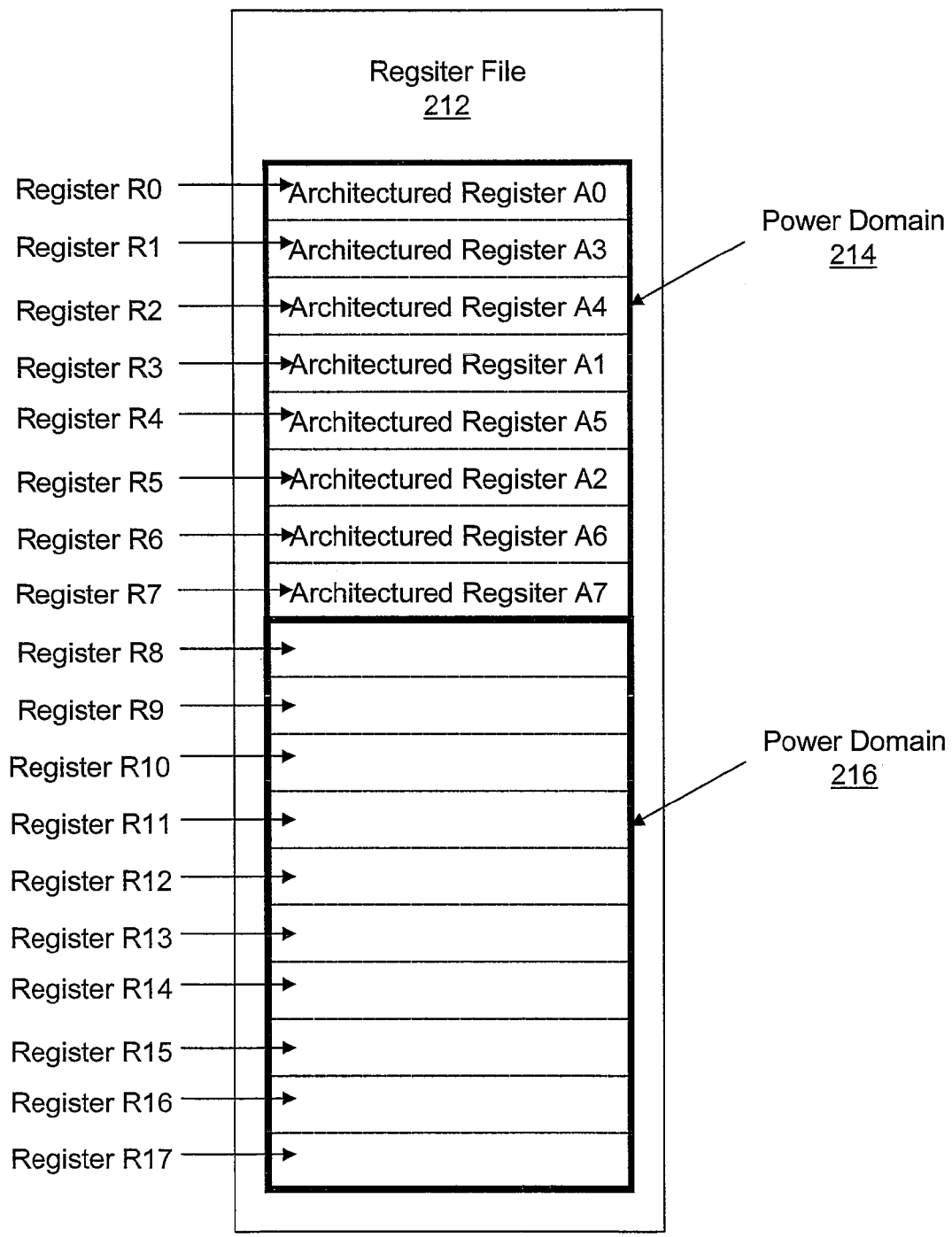
" and FIG. 5 depicts the state of the register file from FIG. 2 after "scrubbing."

Referring now to FIG. 5, there is depicted a diagram of register file 212 after the "scrubbing." Registers A3-A7 have been moved into power domain 214. All architected registers A0-A7 are now assigned to physical registers in power domain 214, which will not be powered off in response to the detection of the idle condition. Power domain 216 can be powered off and the architectural state of the processor thread will be preserved.

As has been described, the present invention provides an improved method for reducing leakage current within a register file of a processor.

While an illustrative embodiment of the present invention has been described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for reducing power consumption of a processor, said method comprising:

partitioning a register file within a processor into at least two power domains, wherein each of said power domains is powered independently, wherein said register file includes rename register file entries and architected register file entries, and wherein at least one said power domains includes a number of register that is equal to or greater than the number of architected register defined in the ISA;

in response to an occurrence of an idle condition within said processor, consolidating all architected register file entries in one of said power domains, wherein each of said architected register file entries represents an architected register of a processor thread; and powering off one of said power domains that does not contain any architected register file entries; and thereafter, in response to a detection of an end of said idle condition, powering on all of said power domains.

\* \* \* \* \*